June 30, 1931. C. S. MacKENZIE 1,812,160
SHOVEL
Filed Jan. 2, 1930
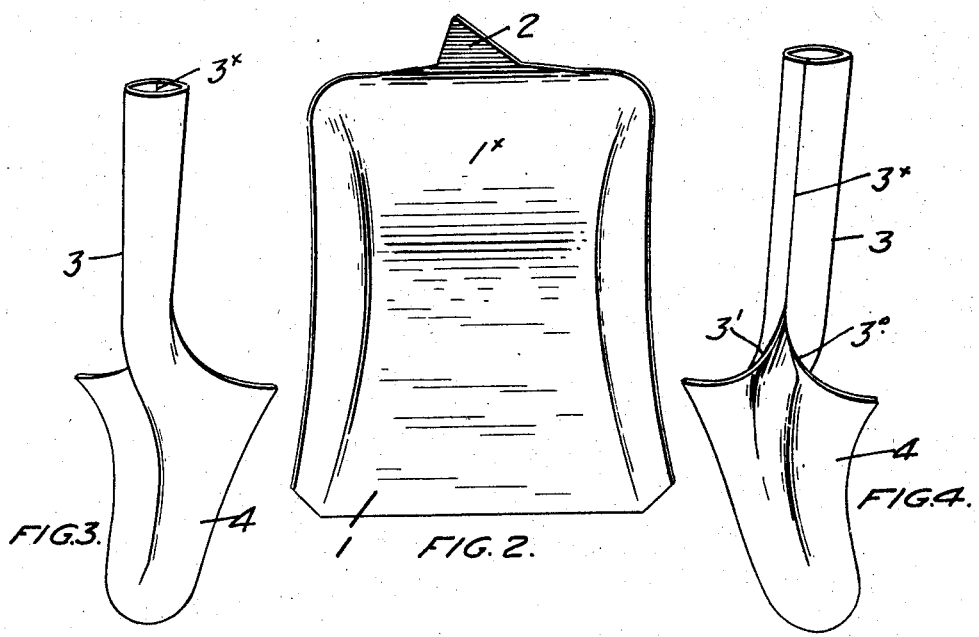
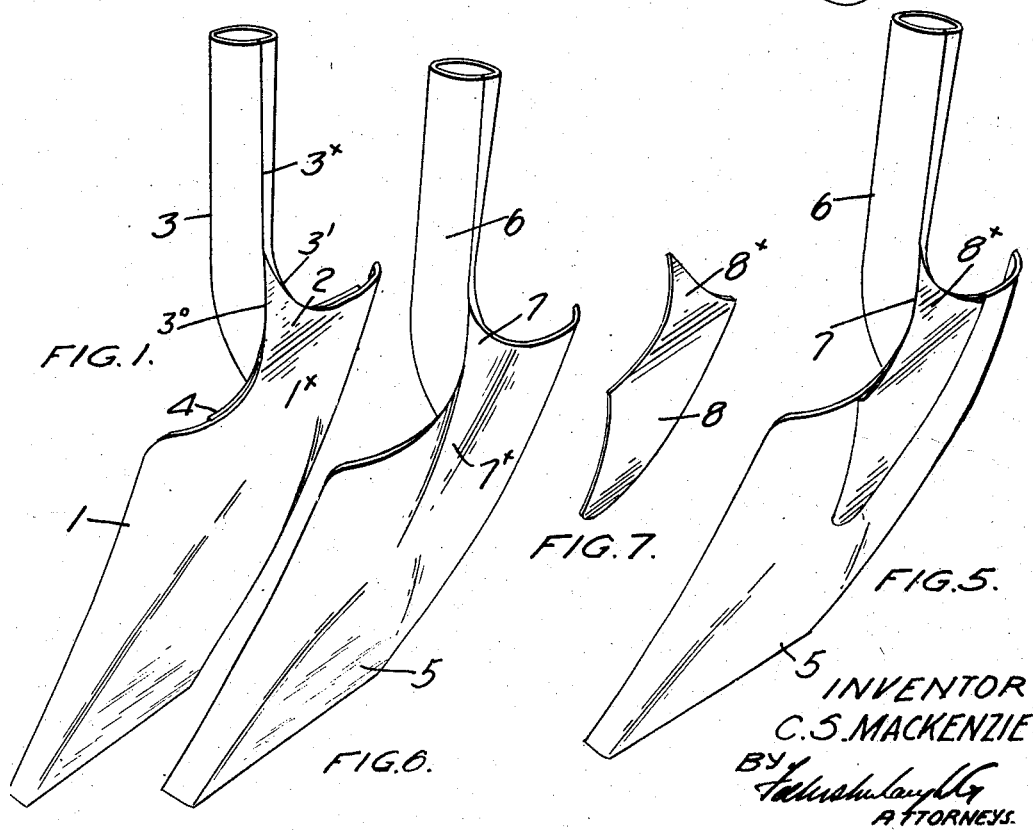
INVENTOR
C.S. MACKENZIE
ATTORNEYS.

Patented June 30, 1931

1,812,160

UNITED STATES PATENT OFFICE

CHARLES SIDNEY MacKENZIE, OF GANANOQUE, ONTARIO, CANADA

SHOVEL

Application filed January 2, 1930. Serial No. 418,055.

My invention relates to improvements in shovels, and the object of the invention is to devise means for reinforcing the heel of the shovel, that is the portion between the blade and the shank, so that when the shovel is used for a lever and is fulcrumed upon this portion there will be no danger of breaking down the back of the shovel by buckling, and it consists essentially of the arrangement and construction of parts as hereinafter more particularly explained.

Fig. 1 is a perspective view of my shovel looking at the rear thereof.

Fig. 2 is a perspective detail of the shovel blade.

Fig. 3 is a perspective detail of the shovel shank and frog.

Fig. 4 is a similar view to Fig. 3 looking at the reverse side.

Fig. 5 is a perspective view illustrating an alternative construction.

Figs. 6 and 7 are perspective details of the parts comprising the construction illustrated in Fig. 5 separated apart.

In the drawings like characters of reference indicate corresponding parts in each figure.

I will first refer to Figures 1, 2, 3 and 4.

1 indicates the blade of the shovel which is provided at its upper edge with a tongue 2 extending forward and upward in substantially triangular form.

3 is the shank of the shovel which is split tubular in form the split line indicated at $3^x$ spreading apart at its lower end as indicated at $3^o$ and $3^1$ so as to fit each side edge of the tongue 2. 4 is a frog which is formed integral with the shank 3 and fits against the front face of the blade 1. When the tongue 2 is inserted in position as above described, the tongue 2, shank 3, frog 4 and blade 1 are then welded together, the tongue 2 inserted in the lower portion of the shank adjacent the frog serving to reinforce that portion so that when, for instance, the shovel is used as a crow bar, the lower edge of the blade is inserted as a lever under some object it is desired to lift and downward pressure is exerted upon the handle of the shovel so that the portion $1^x$ bears upon the ground or other support to serve as a fulcrum, there is no danger of the blade and shank breaking apart as is frequently found to be the case in constructions hitherto employed.

I will now refer to Figs. 5 to 7.

5 is the blade of the shovel. 6 is the split shank which is formed integral with the shovel thereby leaving an opening 7 between the shank and the shovel blade from which a recess $7^x$ extends downwardly into the body of the blade forming the frog of the shovel. 8 is an insert piece provided with a tongue $8^x$ which is similar in form to the tongue 2 and fits within the orifice 7, the insert piece 8 extending over the recess 7 in the position shown in Fig. 5. When in this position the parts are welded together thereby reinforcing the back of the shovel in a similar manner to that illustrated in Figs. 1, 2 and 4.

From this description it will be seen that I have devised a very simple construction of shovel, the back of which will be reinforced so that the shovel will permit of any type of rough usage to which it is commonly subjected, particularly when in the hands of section men of a railroad, so that there will be no danger of the back of the shovel becoming broken when the shovel is used as a lever or when subjected to any other hard usage, and yet will permit the employment of a split socket into which the shovel handle may be readily inserted.

What I claim as my invention is:

A shovel comprising a shovel blade having a substantial transversely flat central portion extending to the upper margin of the blade, a handle in the form of a tube split longitudinally at its rear, a frog formed integral with the handle the side edges of the split merging into the upper edge of the frog to form a V shaped rear recess, and a tongue formed integral with the blade and extending from the upper edge thereof and having its marginal edges fitting the marginal edges of the recess a welded joint being formed between such edges and between the frog and the face of the shovel.

CHARLES SIDNEY MacKENZIE.